United States Patent
Nam et al.

(10) Patent No.: US 10,387,671 B2
(45) Date of Patent: Aug. 20, 2019

(54) PRIVATE DATA MANAGEMENT SYSTEM AND METHOD THEREFOR

(71) Applicant: Ki-won Nam, Seoul (KR)

(72) Inventors: Ki-won Nam, Seoul (KR); Gil-ju Park, Daejeon (KR)

( * ) Notice: Subject to any disclaimer, the term of this patent is extended or adjusted under 35 U.S.C. 154(b) by 118 days.

(21) Appl. No.: 15/504,653

(22) PCT Filed: Aug. 12, 2015

(86) PCT No.: PCT/KR2015/008458
§ 371 (c)(1),
(2) Date: Feb. 16, 2017

(87) PCT Pub. No.: WO2016/028027
PCT Pub. Date: Feb. 25, 2016

(65) Prior Publication Data
US 2017/0255791 A1    Sep. 7, 2017

(30) Foreign Application Priority Data
Aug. 18, 2014    (KR) .................. 10-2014-0107267

(51) Int. Cl.
*G06F 21/00* (2013.01)
*G06F 21/62* (2013.01)
*G06F 21/31* (2013.01)
*G06F 21/60* (2013.01)
*G06F 11/14* (2006.01)

(52) U.S. Cl.
CPC .......... *G06F 21/6218* (2013.01); *G06F 21/00* (2013.01); *G06F 21/31* (2013.01); *G06F 21/60* (2013.01); *G06F 11/1458* (2013.01); *G06F 2201/805* (2013.01)

(58) Field of Classification Search
CPC . H04L 67/10; G06F 17/30864; G06F 3/0644; G06F 17/30575; G06F 3/0619
See application file for complete search history.

(56) References Cited

U.S. PATENT DOCUMENTS

2013/0266141 A1*  10/2013  Kim ..................... H04W 12/02
                                                                                    380/270
2014/0310381 A1*  10/2014  Koo ........................ H04L 67/10
                                                                                    709/217

FOREIGN PATENT DOCUMENTS

| JP | 2007-234054 A | 9/2007 |
| JP | 2009-157437 A | 7/2009 |
| JP | 2012-226544 A | 11/2012 |
| KR | 10-2013-0049623 A | 5/2013 |
| KR | 10-2013-0101641 A | 9/2013 |

* cited by examiner

*Primary Examiner* — Ghazal B Shehni
(74) *Attorney, Agent, or Firm* — Patent Office of Dr. Chung Park

(57) ABSTRACT

The present invention relates to a private data management system and a method therefor. The present invention has an object to provide a private data management system capable of significantly decreasing hacking possibility and preventing data from being leaked even at the time of a loss of a user terminal, by randomly distributing, storing and managing private data of a user without storing the private data in the user terminal or a specific server, and recovering the private data in the user terminal by a plurality of authentication procedures as necessary, and a method therefor.

18 Claims, 12 Drawing Sheets

PRIVATE DATA MANAGEMENT SYSTEM AND METHOD THEREFOR

CROSS-REFERENCE TO PRIOR APPLICATIONS

This application is a national Stage Patent Application of PCT International Patent Application No. PCT/KR2015/008458, filed on Aug. 12, 2015 under 35 U.S.C. § 371, which claims priority of Korean Patent Application No. 10-2014-0107267, filed on Aug. 18, 2014, which are all hereby incorporated by reference in their entirety.

TECHNICAL FIELD

The present invention relates to a private data management system and a method therefor, and more particularly, to a private data management system capable of significantly decreasing hacking possibility and preventing data from being leaked even at the time of a loss of a user terminal, by randomly distributing, storing and managing private data of a user without storing the private data in the user terminal or a specific server, and recovering the private data in the user terminal by a plurality of authentication procedures as necessary, and a method therefor.

BACKGROUND ART

In recent years, as data communication technique has been rapidly developed, various types of financial processings such as transfer and settlement are performed online through private digital assistants. In order to process the financial processings, identification information that can identify an individual is required, and private information including the identification information is stored in a financial server.

Accordingly, as several millions of private information are stored in one financial server, the financial server has been targeted by hackers. In fact, many financial servers are hacked and a lot of private information is in circulation for illegal use.

The biggest reason why the financial servers are targeted by the hackers is that there is a lot of available private information. In other words, even if much time hacking the financial server is spent, the hackers may get a large amount of available private information upon successful hacking, such that the financial server is often targeted by the hackers.

Meanwhile, the recent personal digital assistants with functions of a camera and wireless Internet store various types of private data. However, the private data may be very frequently leaked on the Internet, and therefore parties which have experienced a leak of privacy data get a hard time. Especially, when private data of star entertainers are leaked, the ripple effect on the whole nation may be very great.

Various security technologies for preventing leakage of the private data have been introduced. However, there is a problem hacking data stored in the server is not impossible in reality, and data stored in the personal digital assistants can also be hacked and leaked.

DISCLOSURE

Technical Problem

In consideration of the above-mentioned circumstances, it is an object of the present invention to provide a private data management system capable of significantly decreasing hacking possibility and preventing data from being leaked even at the time of a loss of a user terminal, by randomly distributing, storing and managing private data of a user without storing the private data in the user terminal or a specific server, and recovering the private data in the user terminal by a plurality of authentication procedures as necessary, and a method therefor.

Technical Solution

In order to accomplish the above objects, according to one aspect of the present invention, there is provided a private data management method, including the steps of: a) receiving, by a private data management application 6 installed in a user terminal 2, a driving signal; b) determining, by the private data management application 6, whether a data distribution selection signal is applied; c) determining, by the private data management application 6, whether a specific data is selected; d) requesting, by the private data management application 6, data transmission target information to a data management server 10; e) providing, by the data management server 10, the data transmission target information to the private data management application 6; f) partitioning, by the private data management application 6, data into a predetermined number of data and processing the partitioned data; and g) transmitting the respective partitioned data while arbitrarily matching the partitioned data to a data transmission target terminal.

Preferably, in the private data management method according to the present invention, the step e) further includes randomly extracting, by the data management server 10, a predetermined number of identification information from an identification information pool of storage target terminals.

Preferably, in the private data management method according to the present invention, the step f) further includes randomly extracting, by the private data management application 6, some of the data transmission target terminals provided from the data management server 10 to determine a final transmission target terminal.

Preferably, in the private data management method according to the present invention, the step g) further includes transmitting, by the private data management application 6, partitioned backup data to a separate data backup target terminal.

Preferably, the private data management method according to the present invention further includes the steps of: after the step g), h) determining, by the private data management application 6, whether a data recovery mode is selected; i) extracting, by the private data management application 6, information on a target terminal distributing and storing the partitioned data of data when a specific data recovery signal is received; j) receiving, by the private data management application 6, data by performing a data transmission request to a data storage target terminal; and k) recovering, by the private data management application 6, the data when the reception of the data is completed.

Preferably, in the private data management method according to the present invention, the step k) further includes the steps of: extracting, by the private data management application 6, information on a data backup storage target terminal from some terminals if the data is not received until a predetermined time elapses; and performing, by the private data management application 6, a data transmission request to the backup storage target terminal.

Preferably, the private data management method according to the present invention further includes the steps of: between the step h) and the step i), l) transmitting, by the private data management application 6, data information to be recovered to the data management server 10 and requesting authentication user information of the data; m) transmitting, by the data management server 10, the authentication user information of the data to the private data management application 6; n) requesting, by the private data management application 6, an input of private authentication information to the user terminal 2 of an authentication user; and o) transmitting, by the user terminal 2 of the authentication user, an authentication acknowledge signal to the private data management application 6 when private authentication succeeds in the user terminal 2 of the authentication user.

Preferably, the private data management method according to the present invention further includes the steps of: when an authentication failure signal is received from the user terminal 2 of the authentication user during the step o), transmitting, by the private data management application 6, authentication failure information to the data management server 10; transmitting, by the private data management application 6, a request signal of new authentication user information to the data management server 10 when the authentication signal is not received until a predetermined time exceeds; and transmitting, by the data management server 10, the new authentication user information to the private data management application 6.

Preferably, in the private data management method according to the present invention, the step k) further includes: determining whether specific partitioned data are not received until a predetermined time elapses; extracting user terminal information storing backup data when the specific partitioned data are not received; and requesting, by the private data management application 6, a data transmission to the user terminal 2 storing the backup data.

Preferably, the private data management method according to the present invention further includes the step of: when a transmission user terminal 2-1 partitioning and transmitting data and a reception user terminal 2-3 attempting to recover the partitioned and stored data are different from each other, transmitting, by a transmission user terminal 2a, data partitioned and stored by the transmission user terminal 2-1, received authentication information, and information on a terminal storing the remaining partitioned data to the reception user terminal 2-3.

According to another aspect of the present invention, there is provided a private data management system, including: a plurality of user terminals 2 having a private data management application 6 installed therein, which is driven by user authentication, and is configured to automatically partition specific data selected by the user into a plurality of data so as to distribute and transmit the data to the plurality of user terminals 2 of a specific identification number transmitted from a data management server 10, and collect and recover the distributed data according to a user recovery command; and the data management server 10 configured to store identification information on the user terminal in which the private data management application 6 is installed, and receive a data distribution signal from the user terminal 2 so as to extract identification information on a specific user terminal to be a target in which data are distributed and stored, and transmit the extracted identification information of the terminal to the user terminal 2.

Preferably, in the private data management system according to the present invention, the data management server 10 is configured to randomly extract a predetermined number of identification information from an identification information pool of storage target terminals when extracting identification information on a specific user terminal.

Preferably, in the private data management system according to the present invention, the private data management application 6 is configured to randomly extract a predetermined number of identification information among the identification information on the user terminal provided from the data management server 10.

Preferably, in the private data management method according to the present invention, the private data management application 6 is configured to store any one of the plurality of partitioned data in the user terminal 2, and distribute and store other data in the plurality of user terminals 2 of a specific identification number.

Preferably, in the private data management system according to the present invention, the private data management application 6 includes a communication module 20 configured to communicate with a plurality of user terminals 2 for distributing and storing data and the data management server 10; a user authentication unit 22 configured to authenticate a user by private identification information authentication; a storage target information request unit 24 configured to automatically request storage target information for distributing and storing data to the data management server 10; a data partition processing unit 28 configured to partition and process specific data selected by the user; an encryption/decryption processing unit 32 configured to encrypt and decrypt data to be communicated; a data storage unit 34 configured to store some of the partitioned data, and store information on a storage target in which each of the partitioned data is stored; and a control unit 36 configured to communicate with the data management server 10 to receive the information on the data storage target, partition the specific data and store some of the specific data, transmit other data to a plurality of data storage target terminals and distribute and store the other data, and transmit a transmission request signal of the specific data to the storage target terminal during recovery of the data.

Preferably, in the private data management system according to the present invention, the private data management application 6 further includes a storage target random extraction unit 26 configured to randomly extract some of storage target information received from the data management server 10.

Preferably, in the private data management system according to the present invention, the private data management application 6 further includes a storage target random matching unit 30 configured to randomly match the partitioned data with a target in which the data are stored.

Preferably, in the private data management system according to the present invention, the data management server 10 registers single authentication user information, which is required for the authentication during recovery of the specific data, at the time of the distribution and storage of the data, and provides the authentication user information to the private data management application 6 when the private data management application 6 requests the data recovery.

Preferably, in the private data management system according to the present invention, the private data management application 6 is configured to request the input of the private authentication information to the user terminal 2 of the authentication user when receiving the authentication user information from the data management server 10, and the user terminal 2 of the authentication user transmits an authentication acknowledge signal to the private data management application 6 when private authentication succeeds.

Preferably, in the private data management system according to the present invention, when a transmission user terminal 2-1 partitioning original data and a reception user terminal 2-3 recovering the original data are different from each other, the user terminal 2 is configured to transmit data partitioned and stored by the transmission user terminal 2-1, received authentication information, and information on a terminal storing the remaining partitioned data to the reception user terminal 2-3.

Advantageous Effects

The private data management system and the method therefor according to the present invention may segment private data, and distribute and store the private data in the plurality of user terminals. As a result, hackers may not get data at all or get only some of the partitioned data even if they hack the data management server, the e-mail server, or the SNS server, and therefore hacking is useless and the hackers may not get all the partitioned data unless the hackers hack the plurality of second user terminals even if they hack the server and may get only the specific data of one person even if they hack the plurality of user terminals related to the specific data, and therefore the hackers little gain a profit, such that the security performance may be strengthened.

BEST MODE

Hereinafter, a private data management system according to the first embodiment of the present invention will be described in detail with reference to the accompanying drawings.

Figure 1:
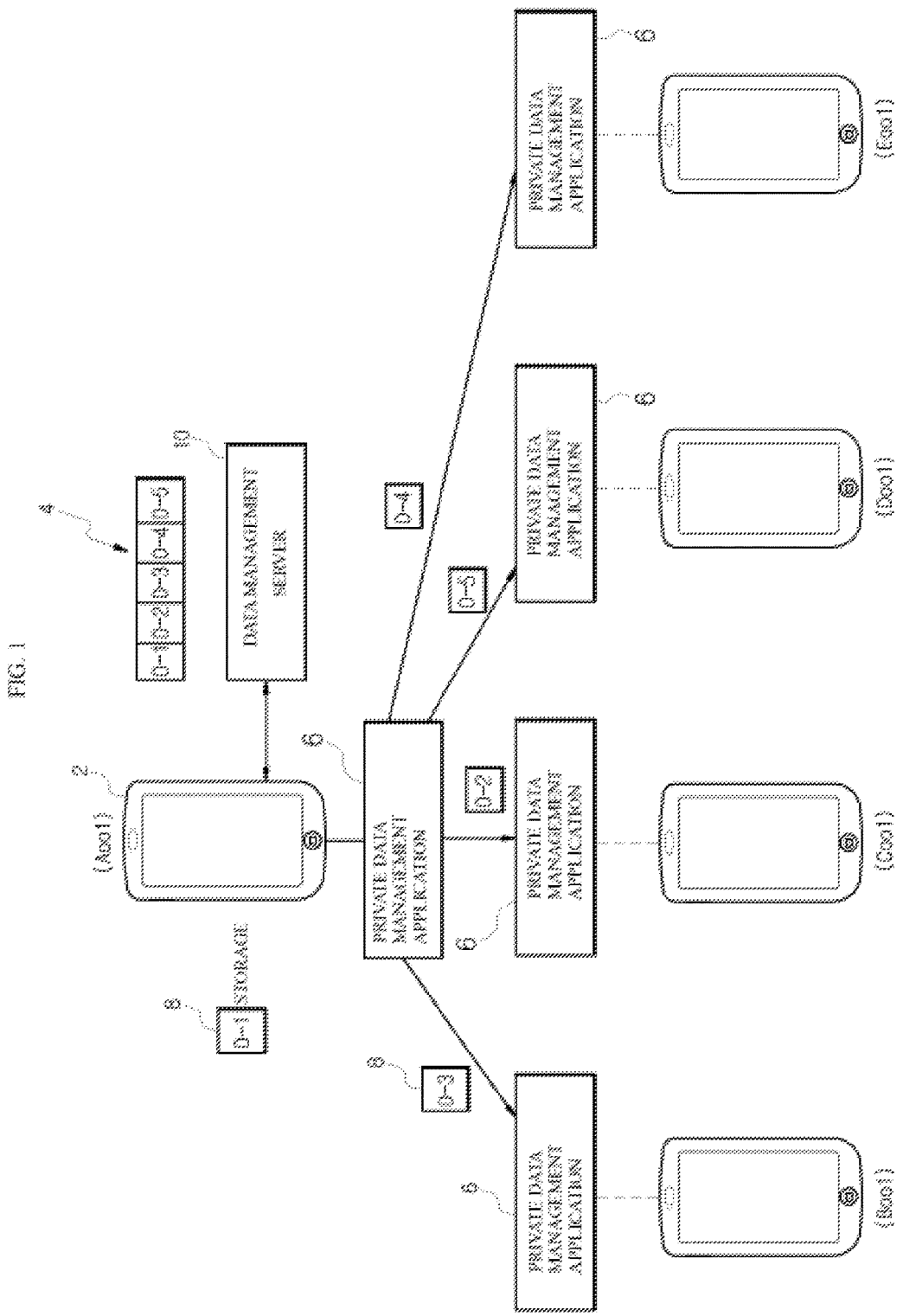
FIG. 1 is a schematic diagram illustrating a configuration of a private data management system according to a first embodiment of the present invention.
Figure 2:
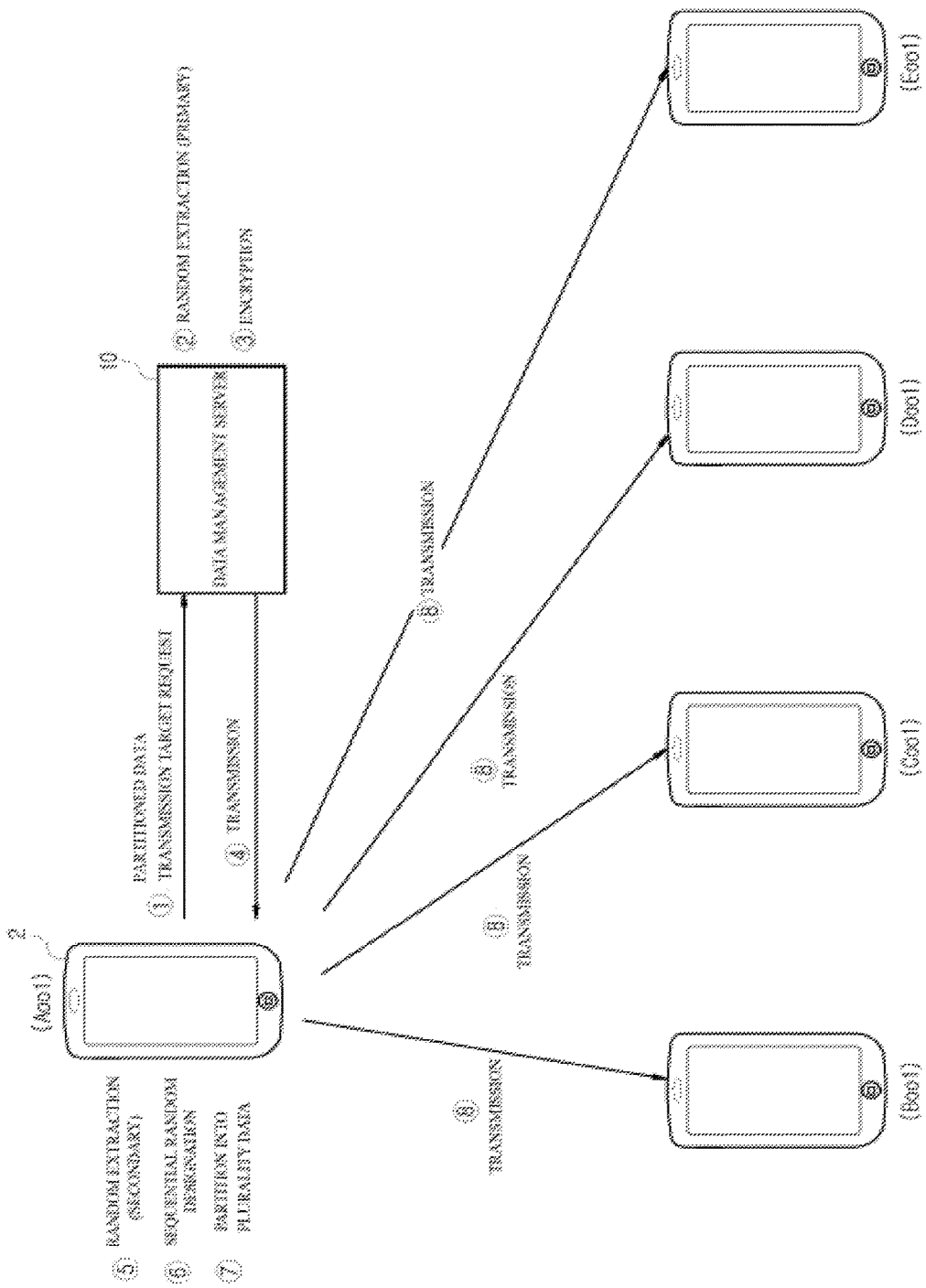
FIG. 2 is a diagram illustrating a selection state of a data storage target by the private data management system according to the first embodiment of the present invention.
Figure 3:
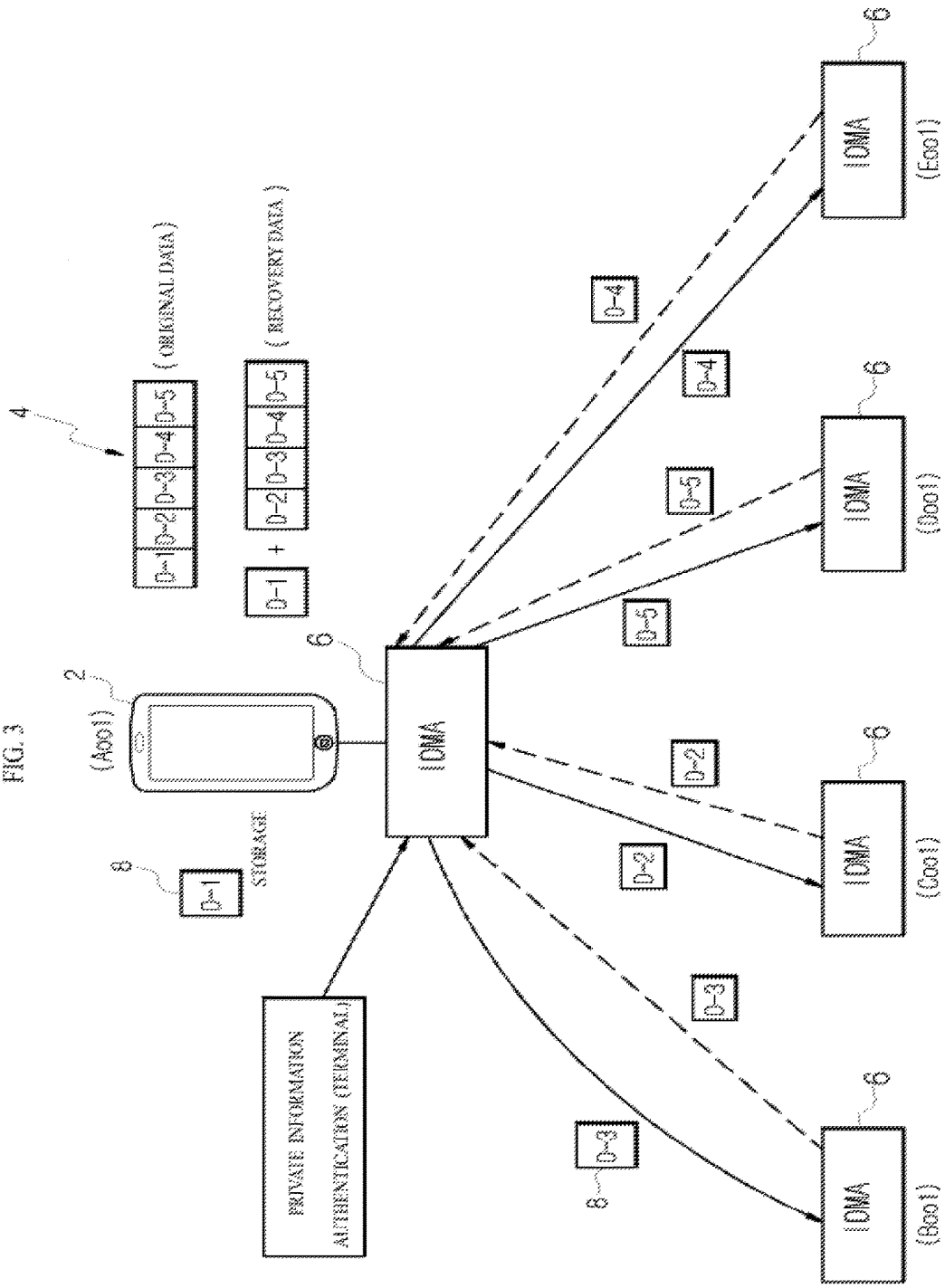
FIG. 3 is a diagram illustrating a data partition storage and recovery state by the private data management system according to the first embodiment of the present invention.

FIG. 1 is a schematic diagram illustrating a configuration of a private data management system according to a first embodiment of the present invention, FIG. 2 is a diagram illustrating a selection state of a data storage target by the private data management system according to the first embodiment of the present invention, and FIG. 3 is a diagram illustrating a data partition storage and recovery state by the private data management system according to the first embodiment of the present invention.

Referring to these drawings, the private data management system according to the first embodiment of the present invention is a system capable of significantly decreasing hacking possibility and preventing data from being leaked even at the time of a loss of a user terminal, by randomly distributing, storing and managing private data of a user without storing the private data in the user terminal or a specific server, and recovering the private data in the user terminal by a plurality of authentication procedures as necessary.

That is, the private data management system according to the first embodiment of the present invention does not store all data to be stored by a user in any one of storage means in a batch but partitions all the data into a plurality of data and distributes and stores the data, such that it is possible to prevent the data from being leaked even if any one of the storage means is hacked.

More specifically, the private data management system according to the first embodiment of the present invention includes a plurality of user terminals 2 having a private data management application 6 installed therein, which is driven by user authentication, and is configured to automatically partition specific data selected by the user into a plurality of data so as to distribute and transmit the data to the plurality of user terminals 2 of a specific identification number transmitted from a data management server 10, and collect and recover the distributed data according to a user recovery command; and the data management server 10 configured to store identification information on the user terminal in which the private data management application 6 is installed, and receive a data distribution signal from the user terminal 2 so as to extract identification information on a specific user terminal to be a target in which data are distributed and stored, and transmit the extracted identification information of the terminal to the user terminal 2.

In this case, the user terminal 2 may be classified into a data partition and recovery user terminal 2 configured to store original data 4 that are not partitioned and actually partition the original data 4 to transmit the partitioned data to a separate storage means, and again recover the partitioned data into the original data 4; and a storing user terminal 2 for storing partitioned data 8 transmitted from the user terminal 2.

That is, the user terminal 2 may have the private data management application 6 installed therein to perform the partition and transmission of the data, receive and store the partitioned data, and recover the partitioned data.

Therefore, the user terminal 2 does not have to distinguish according to its function. However, for convenience of explanation, the user terminal 2 that partitions and transmits data, and recovers the partitioned data again is allocated a separate code (e.g., A001) and the user terminals 2 that receive the partitioned data and store the partitioned data are also allocated separate codes (e.g., B001, C001, D001, and E001).

Further, for convenience of explanation, the user terminal 2 allocated the code A001 is referred to as a first user terminal 2-1, and the user terminals 2 allocated codes B001 to E001 are referred to as a second user terminal 2-2.

Meanwhile, when extracting identification information on the specific user terminal, the data management server 10 is configured to randomly extract a predetermined number of identification information from an identification information pool of storage target terminals.

That is, if the first user terminal 2-1 requests information on a storage target in which data are partitioned and stored to the data management server 10, the data management server 10 extracts the information on the storage target in which the partitioned data may be stored in advance and transmits the extracted information to the first user terminal 2-1.

Therefore, the data management server 10 stores the information on the storage target in which the partitioned data are stored. Herein, the storage target means a second user terminal 2-2.

In addition, the data management server 10 stores identification information on the second user terminal 2-2 that is a plurality of partitioned data storage target terminals, and randomly extracts identification information on some of the plurality of second user terminals 2-2, and provides it to the first user terminal 2-1 side.

Preferably, the private data management application 6 of the first user terminal 2-1 is configured to randomly extract a predetermined number of identification information among identification information on the user terminals provided from the data management server 10.

That is as in case in which the data management server 10 randomly extracts the identification information on the second user terminal 2-2 and provides the extracted information to the first user terminal 2-1, the first user terminal 2-1 also randomly extracts the identification information on some of the second user terminals 2-2 provided from the data management server 10 and transmits the extracted information to the data management server 10.

Thereby, the data management server 10 included in the private data management system according to the first embodiment of the present invention does not store any one piece of partitioned data to be stored by the first user terminal 2-1, but holds only information on which of the terminals only the partitioned data are stored in, and therefore, even if the data management server 10 is illegally hacked by hackers, the hackers may not secure the user's data.

Meanwhile, the first user terminal 2-1 stores, for example, some 8 (e.g., D-1) of the partitioned data among the entire original data 4 and stores only the identification information on the second user terminals 2-2 (for example, B001, C001, D001, E001 and . . . ) that is the storage target in which the plurality of partitioned data are stored, and therefore even if the first user terminal is hacked by the hackers, the hackers may acquire only some of the partitioned data of data that the user wants to hide.

That is, the private data management application 6 installed in the first user terminal 2-1 is configured to store any one of the plurality of partitioned data in the first user terminal 2-1, and distribute and store other data in the plurality of user terminals 2, that is, the second user terminal 2-2 of the specific identification number.

At this time, the plurality of second user terminals 2-2 storing the distributed data are any one of a server, a PC and the like.

In addition, data 8 (e.g., D-3) that are any one of the partitioned data are stored in any one (e.g., B001) of the second user terminals 2-2 in which the original data 4 are distributed and stored, data 8 (e.g., D-2) that are any one of the partitioned data are stored in any one (e.g., C001) of the second user terminals 2-2, data 8 (e.g., D-5) that are any one of the partitioned data are stored in any one (e.g., D001) of the second user terminals 2-2, and data 8 (e.g., D-4) that are any one of the partitioned data are stored in any one (e.g., E001) of the second user terminals 2-2, and therefore even if any one of the second user terminals 2 is hacked by the hackers, the hackers may acquire only some of the partitioned data In particular, generally, a plurality of user data are stored in any one server, and therefore it is possible to gain costs corresponding to efforts required for hacking at the time of hacking. However, according to the present invention, even if the hackers hack the data management server 10, the original data that the hackers may acquire are never stored in the data management server. Therefore, the hackers have to hack a myriad of user terminals 2 to obtain any one of private data. Therefore, realistically, there is little cost that the hackers may acquire.

Meanwhile, like transmission/reception of general communication data, in the private data management system according to the first embodiment of the present invention, the data transmitted between the user terminal 2 distributing and storing data and the data management server 10 are encrypted data.

Meanwhile, preferably, the private data management system according to the first embodiment of the present invention is designed as a data backup structure under the assumption that any one of the second user terminals 2-2 is lost or does not perform a response.

That is, the private data management application 6 installed in the first user terminal 2-1 is configured to transmit the partitioned data to a plurality of data transmission target terminals, for example, the second user terminal 2-2, and transmit the same partitioned data to another second user terminal 2-2 that is a backup target to back the same partitioned data up, and perform the recovery processing using the backup data if the specific partitioned data are not recovered within a predetermined time during recovery of the data.

Therefore, the private data management application 6 installed in the first user terminal 2-1 may store the identification information on the second user terminal 2-2 storing the partitioned data and the identification information on the second user terminal 2-2 storing the backup data, respectively.

Figure 4:
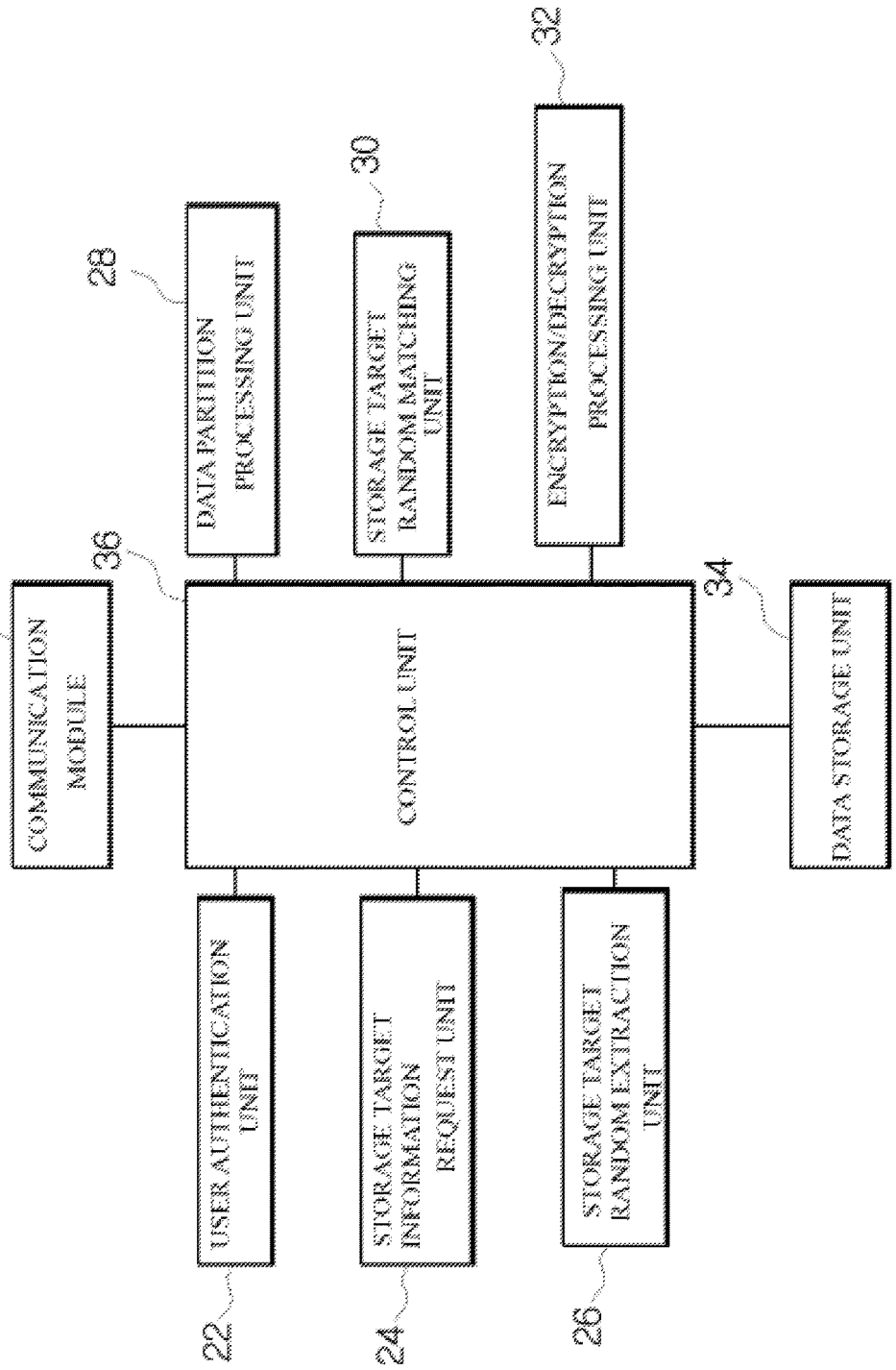
FIG. 4 is a block diagram illustrating an operational configuration of a private data management application included in the private data management system according to the first embodiment of the present invention.

FIG. 4 is a block diagram illustrating an operational configuration of the private data management application included in the private data management system according to the first embodiment of the present invention.

Referring to FIG. 4, the private data management application 6 includes a communication module 20 configured to communicate with a plurality of user terminals 2 for distributing and storing data and the data management server 10; a user authentication unit 22 configured to authenticate a user by private identification information authentication; and a storage target information request unit 24 configured to automatically request storage target information for distributing and storing data to the data management server 10.

In addition, the private data management application 6 includes a data partition processing unit 28 configured to partition and process specific data selected by the user; an encryption/decryption processing unit 32 configured to encrypt and decrypt data to be communicated; a data storage unit 34 configured to store some of the partitioned data, and store information on a storage target in which each of the partitioned data is stored; and a control unit 36 configured to communicate with the data management server 10 to receive the information on the data storage target, partition the specific data and store some of the specific data, transmit the other data to a plurality of data storage target terminals, and distribute and store the other data, and transmit a transmission request signal of the specific data to the storage target terminal during recovery of the data.

Meanwhile, the private data management application 6 further includes a storage target random extraction unit 26 configured to randomly extract some of the storage target information received from the data management server 10.

Further, the private data management application 6 further includes a storage target random matching unit 30 configured to randomly match the partitioned data with a target in which the data are stored.

Functions and operations of the private data management system according to the first embodiment of the present invention having the foregoing configuration will be described in detail with reference to the accompanying drawings.

Figure 5:
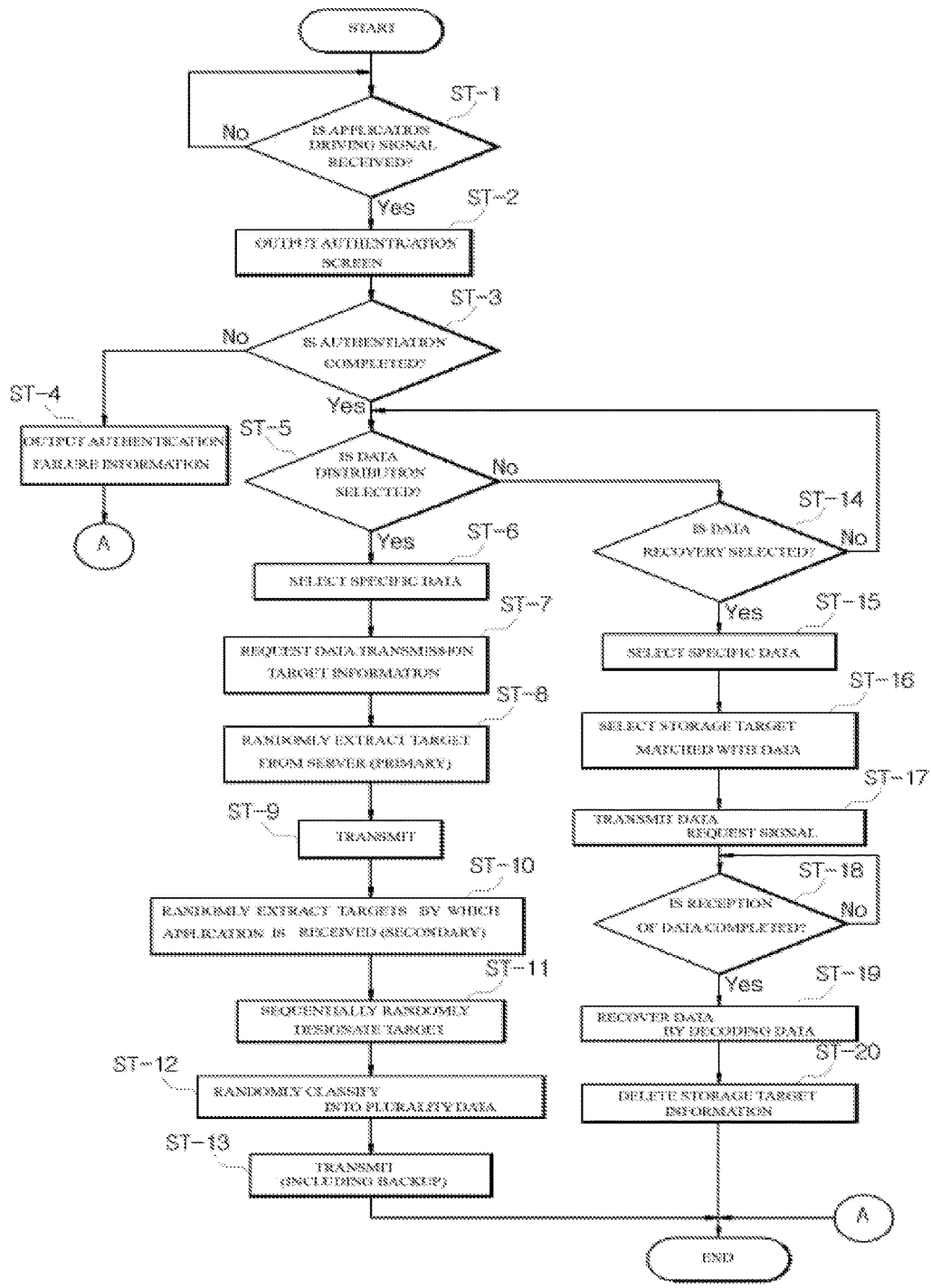
FIG. 5 is a flow chart illustrating a signal flow of the private data management system according to the first embodiment of the present invention.

FIG. 5 is a flow chart illustrating a signal flow of the private data management system according to the first embodiment of the present invention.

First, the user who owns the user terminal 2, for example, the first user terminal 2-1 included in the private data management system according to the first embodiment of the present invention drives the private data management application 6 to distribute and store the specific data, and inputs private authentication information such as a password to perform authentication.

If the authentication succeeds, the private data management application 6 determines whether a data distribution mode is selected.

When the data distribution mode is selected, the private data management application 6 determines whether a distributed selection signal for specific data is applied.

When the specific data are selected, the private data management application 6 requests the data transmission target information to the data management server 10.

That is, when the identification information on the storage object for storing the partitioned data is requested to the data management server 10, the data management server 10 stores the identification information on the second user terminal 2-2 that is the terminal in which the plurality of partitioned data are stored, randomly extracts the identification information on some second user terminals 2-2 of the plurality of second user terminals 2-2, and provides the extracted identification information to the private data management application 6 of the first user terminal 2-1.

Then, the private data management application 6 further randomly extracts some of the data transmission target terminals receiving data from the data management server 10 to determine a final transmission target terminal.

Further, the private data management application 6 partitions and processes the data into a predetermined number of data to arbitrarily match each of the partitioned data to the second user terminal 2-2 that is the data transmission target terminal.

In this case, the partitioned backup data are transmitted to a separate data backup target terminal by the private data management application 6.

That is, the private data management application 6 installed in the first user terminal 2-1 transmits the partitioned data to the plurality of data transmission target terminals, for example, the second user terminal 2-2, and transmits the same partitioned data to another second user terminal 2-2 that is a backup target to back the same partitioned data up Meanwhile, the private data management application 6 installed in the first user terminal 2-1 determines whether the data recovery mode is selected. If a specific data recovery signal is received, the private data management application 6 extracts the target terminal information for distributing and storing the partitioned data of the data, for example, the identification information on the second user terminal 2-2.

Further, the private data management application 6 of the first user terminal 2-1 performs the data transmission request to the data storage target terminal, for example, the second user terminals 2-2.

When the reception of the plurality of partitioned data is completed, the private data management application 6 recovers the original data.

In this case, if the data is not received from some of the second user terminals 2-2 until a predetermined time elapses, the private data management application 6 extracts the information on the data backup target terminal.

Further, the private data management application 6 performs the data transmission request to the backup storage target terminal side to recover the original data 4.

Hereinafter, a private data management system according to a second embodiment of the present invention will be described in detail with reference to the accompanying drawings.

Figure 6:
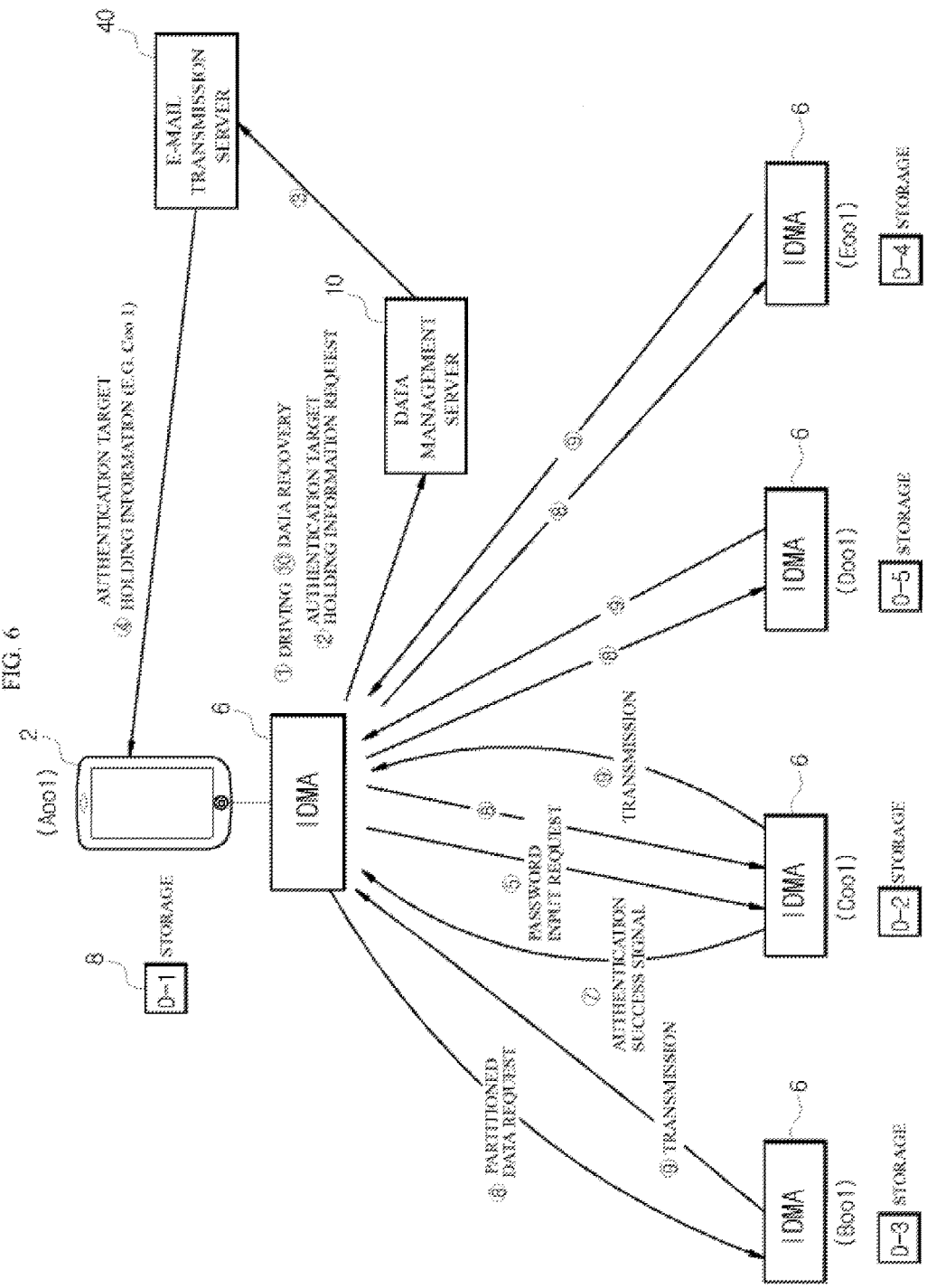
FIG. 6 is a schematic diagram illustrating a configuration of a private data management system according to a second embodiment of the present invention.
Figure 7:
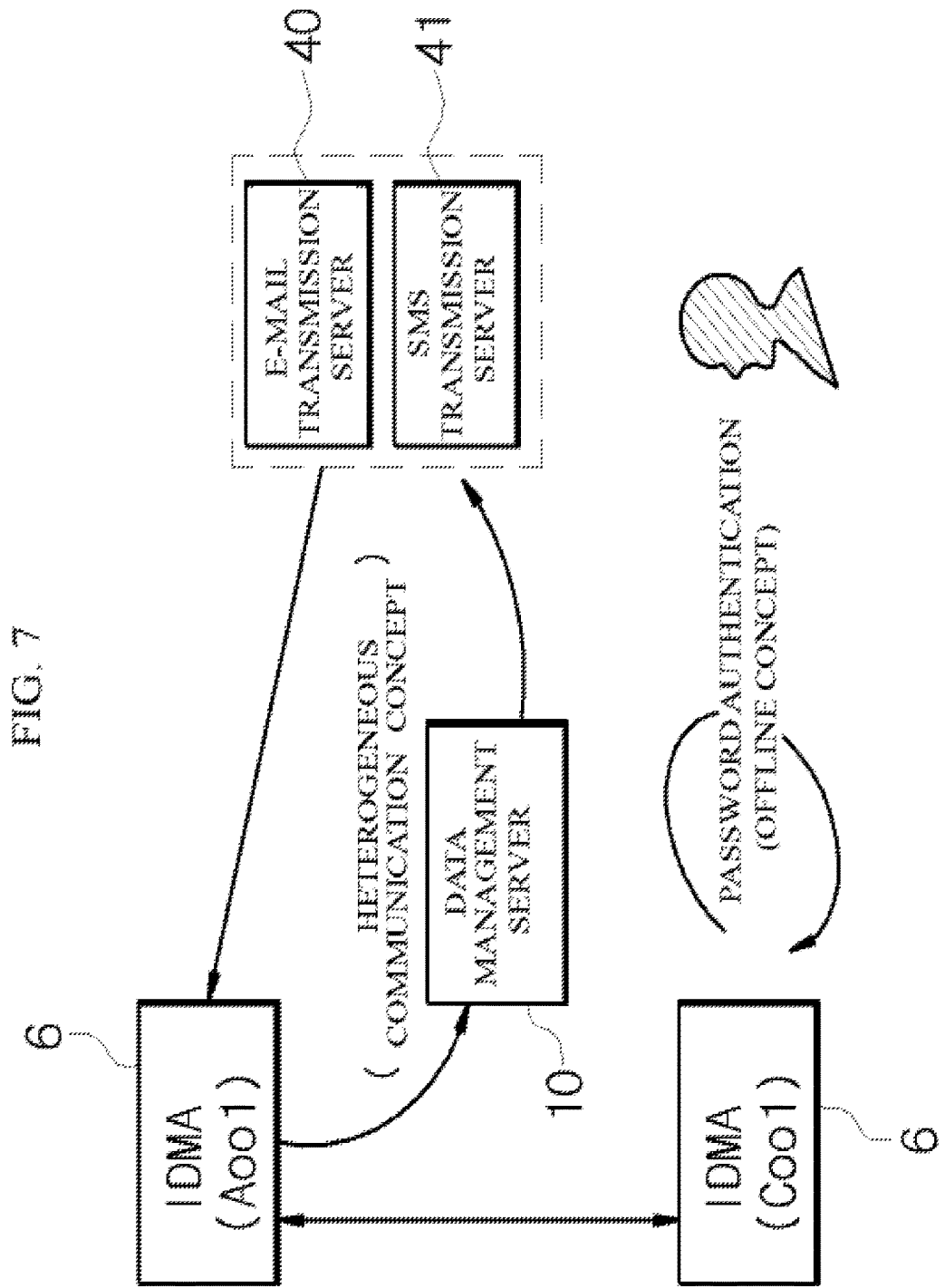
FIG. 7 is a diagram conceptually illustrating a structure of the private data management system according to the second embodiment of the present invention.
Figure 8:
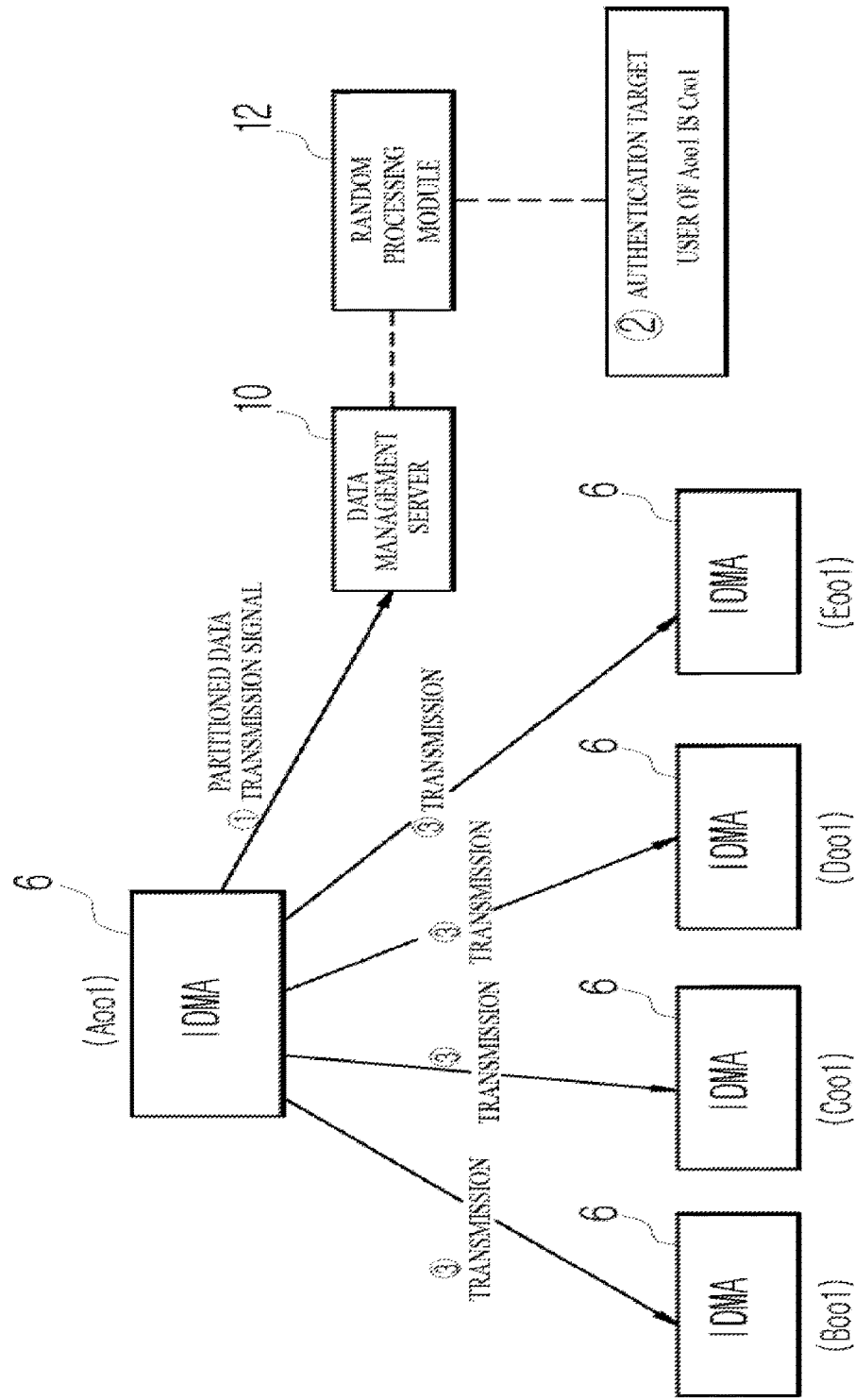
FIG. 8 is a diagram illustrating an authentication target user selection state by the private data management system according to the second embodiment of the present invention.

FIG. 6 is a schematic diagram illustrating a configuration of the private data management system according to the second embodiment of the present invention, FIG. 7 is a diagram conceptually illustrating a structure of the private data management system according to the second embodiment of the present invention, and FIG. 8 is a diagram illustrating an authentication target user selection state by the private data management system according to the second embodiment of the present invention.

Referring to these drawings, the private data management system according to the second embodiment of the present invention is a system including an offline authentication process in addition to the first embodiment.

The private data management system according to the second embodiment of the present invention including the offline authentication further includes an additional authentication process when attempting to recover data from the first user terminal 2-1, and is a system to perform the authentication process of performing user authentication in one of the second user terminals 2-2 storing any one of the partitioned data 8 partitioned by the first user terminal 2-1.

That is, the private data management system according to the second embodiment of the present invention is configured to command the private data management application 6 installed in the second user terminal 2-2 to perform the user authentication of the user terminal 2-2 when attempting to recover specific data from the first user terminal 2-1 and the private data management application 6 of the first user terminal 2-1 to recover data only when an authentication success signal is transmitted to the private data management application 6 of the first user terminal 2-1.

In this case, an owner of the specific second user terminal 2-2 to be authenticated is referred to as an authentication user, and the data management server 10 randomly generates and stores authentication user information using a random processing module 12 so that the generated and stored information matches the identification information on the specific data partitioned by the first user terminal 2-1.

Further, since the authentication user information is not stored in the first user terminal 2-1, even if the hackers attempt to recover data by hacking the first user terminal 2-1, the data recovery is not performed without the authentication user information.

That is, the data management server 10 registers single authentication user information, which is required for the authentication during recovery of the specific data, at the time of the distribution and storage of the data, and provides the authentication user information to the private data management application 6 if the private data management application 6 of the first user terminal 2-1 requests the data recovery.

Therefore, when receiving the authentication user information from the data management server 10, the private data management application 6 of the first user terminal 2-1 is configured to request the input of the private authentication information (e.g., a password, fingerprint, iris information, etc.) to the user terminal 2 (e.g., the user terminal 2-1) side of the authentication user, and the second user terminal 2-2 of the authentication user transmits an authentication acknowledge signal to the private data management application 6 of the first user terminal 2-1 when private authentication succeeds.

In particular, the private data management system according to the second embodiment of the present invention is configured to transmit the authentication user information which is transmitted to the private data management application 6 by the data management server 10 through a text message or e-mail.

That is, in addition to the off-line concept, the private data management system according to the second embodiment of the present invention includes a concept of heterogeneous communication. If the identification information on the authentication user is transmitted by the e-mail of the user owing the first user terminal 2-1, when the identification information on the authentication user is transmitted from the data management server 10 to the first user terminal 2-1, even if hackers figure out the password of the private data management application 6 of the user terminal 2-1, the hackers may not recover the data when they fail to hack an e-mail transmission server 40.

Meanwhile, the specific second user terminal 2-2 that is the target of the authentication user needs to successfully authenticate the user of the private data management application 6 through the input of authentication information on the user. However, the authentication success signal of the authentication user may not be received by the private data management application 6 of the first user terminal 2-1 so that the predetermined time lapses.

In this case, the private data management application 6 may be configured to request new authentication user information to the data management server 10, if authentication acknowledge information on the authentication user is not received until the predetermined time elapses.

Functions and operations of the private data management system according to the second embodiment of the present invention having the foregoing configuration will be described in detail with reference to the accompanying drawings.

Figure 9:
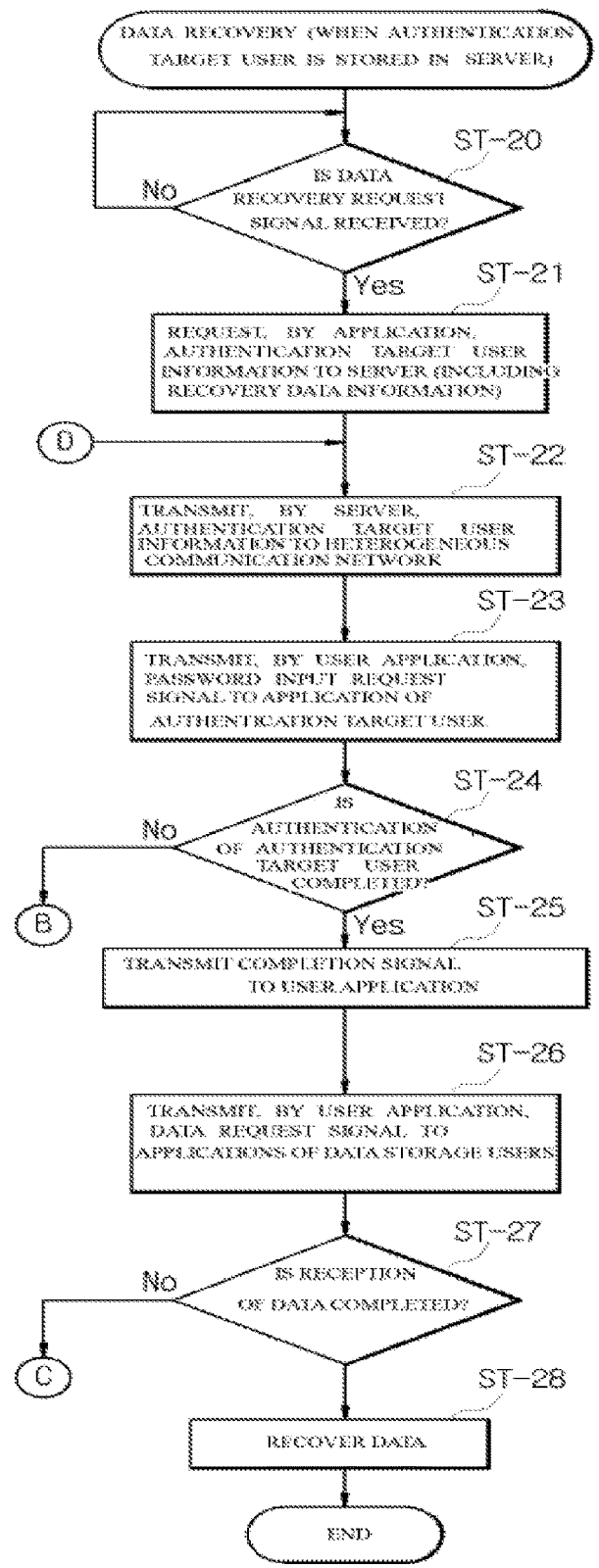
FIGS. 9 to 11 are flow charts illustrating data recovery processes by the private data management system according to the second embodiment of the present invention.
Figure 10:
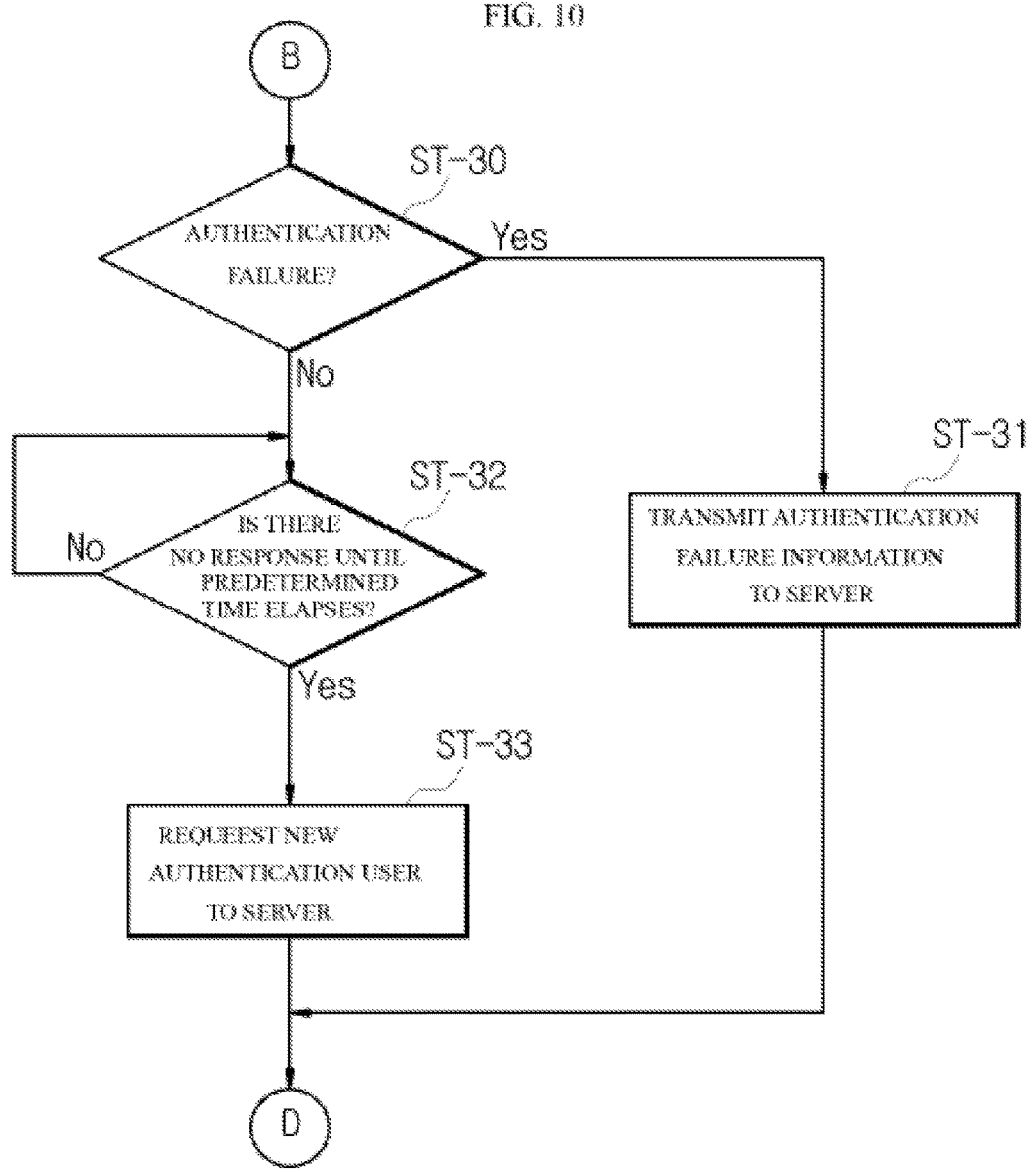
Figure 11:
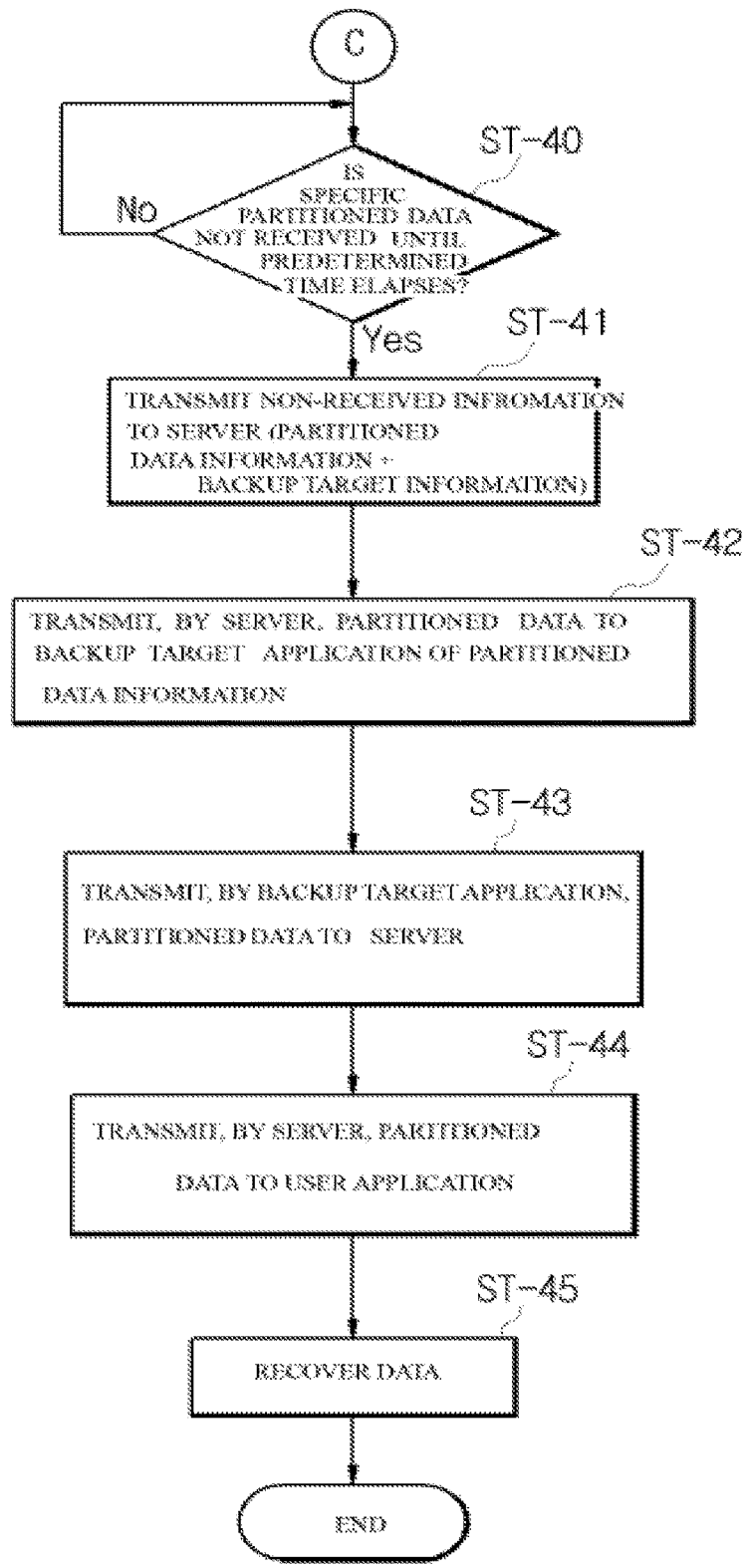

FIGS. 9 to 11 are flow charts illustrating data recovery processes by the private data management system according to the second embodiment of the present invention.

First, the private data management system according to the second embodiment of the present invention further includes an offline authentication concept performing the authentication of the specific user and a heterogeneous communication concept in a step of recovering the partitioned data distributed and stored in a remote site.

The offline authentication concept is to perform the user authentication by allowing a specific user to directly input a password or to input information such as a fingerprint or an iris to perform user authentication. Any user who is joined in a private data management member to install the private data management application 6 in the user terminal 2 may be the target of the authentication user, and the data management server 10 may randomly designate the authentication user.

The designation of the authentication user is performed by the data management server 10 at a time when data recovery is requested from the first user terminal 2-1.

Preferably, although the first user terminal 2-1 may store the identification information on the plurality of second user terminals 2-2 storing the partitioned data of the specific data, the first user terminal 2-1 may transmit the information to the data management server 10 and store the information, and the first user terminal 2-1 may delete the information on the second user terminal 2-2 that is the data storage target terminal.

The private data management application 6 of the first user terminal 2-1 transmits the identification information (for example, Pig 2013) on the specific data to be recovered to the data management server 10 during the recovery of the data, if the information is in the deleted state, and requests the identification information on the authentication user.

Then, the data management server 10 extracts the identification information (for example, a telephone number) on any one of the users having the second user terminal 2-2 in which the private data management application 6 is installed, and transmits the identification information to the private data management application 6 of the first user terminal 2-1.

In this case, preferably, in addition to the off-line concept, the private data management system according to the second embodiment of the present invention includes a concept of heterogeneous communication. If the identification information on the authentication user is transmitted by the e-mail of the user owing the first user terminal 2-1, when the identification information on the authentication user is transmitted from the data management server 10 to the first user terminal 2-1, even if hackers figure out the password of the private data management application 6 of the user terminal 2-1, the hackers may not recover the data when they fail to hack the e-mail transmission server 40.

Next, the private data management application 6 of the first user terminal 2-1 transmits the authentication request signal to the second user terminal 2-2 having the identification information on the authentication user, and preferably, transmits the authentication request signal to the private data management application 6 of the second user terminal 2-2.

Then, the user who owns the second user terminal 2-2 inputs the authentication information to the private data management application 6 of the second user terminal 2-2 to perform the authentication, and therefore the user may input the password of the private data management application 6.

When the password authentication succeeds, the private data management application 6 of the second user terminal 2-2 transmits an authentication success signal to the private data management application 6 of the first user terminal 2-1.

Then, the private data management application 6 of the first user terminal 2-1 transmits the data recovery signal to the plurality of second user terminals 2-2 storing the partitioned data. Preferably, the identification information of data to be recovered is also transmitted together.

Then, the private data management application 6 of the second user terminal 2-2 transmits the partitioned data 8 to the first user terminal 2-1.

The private data management application 6 of the first user terminal 2-1 determines whether or not all of the partitioned data are received, and when the reception of the partitioned data is completed, recovers the data.

On the other hand, if the private data management application 6 of the second user terminal 2-2 receives the private authentication information but fails to perform the private authentication due to a password mismatch or the like, the private data management application 6 of the second user terminal 2-2 transmits authentication failure information to the private data management application 6 of the first user terminal 2-1, and the private data management application 6 of the first user terminal 2-1 transmits the authentication failure information on the authentication user to the data management server 10 again.

Further, the authentication success signal may not be received by the first user terminal 2-1 until a predetermined time elapses.

Even in that case, the private data management application 6 of the first user terminal 2-1 may transmit information on the non-reception of the authentication signal to the data management server 10. Both of the two cases, the private data management application of the first user terminal allows the data management server 10 to request identification information on a new authentication user.

Further, if the authentication succeeds as illustrated in FIG. 11, when the partitioned data are not received by the private data management application 6 of the first user terminal 2-1 until a predetermined time elapses, the private data management application 6 of the first user terminal 2-1 may extract the identification information on the second user terminal 2-2 storing the backup data of the non-received partitioned data to request the transmission of the backup data to the private data management application 6 of the second user terminal 2-2.

Meanwhile, it may be also designed in such a way that the identification information on the second user terminal 2-2 storing the backup data are stored in the data management server 10, and the identification information are not stored in the first user terminal 2-1.

In this case, as illustrated in FIG. 11, the private data management application 6 of the first user terminal 2-1 may request the backup data of the non-received partitioned data to the data management server 10.

Then, the data management server 10 may extract the identification information on the second user terminal 2-2 storing the backup data of the partitioned data to request the transmission of the backup data to the private data management application 6 of the second user terminal 2-2 and receive the backup data, and transmit the received backup data to the first user terminal 2-1 again to perform the data recovery.

Hereinafter, a private data management system according to a third embodiment of the present invention will be described in detail with reference to the drawings.

Figure 12:
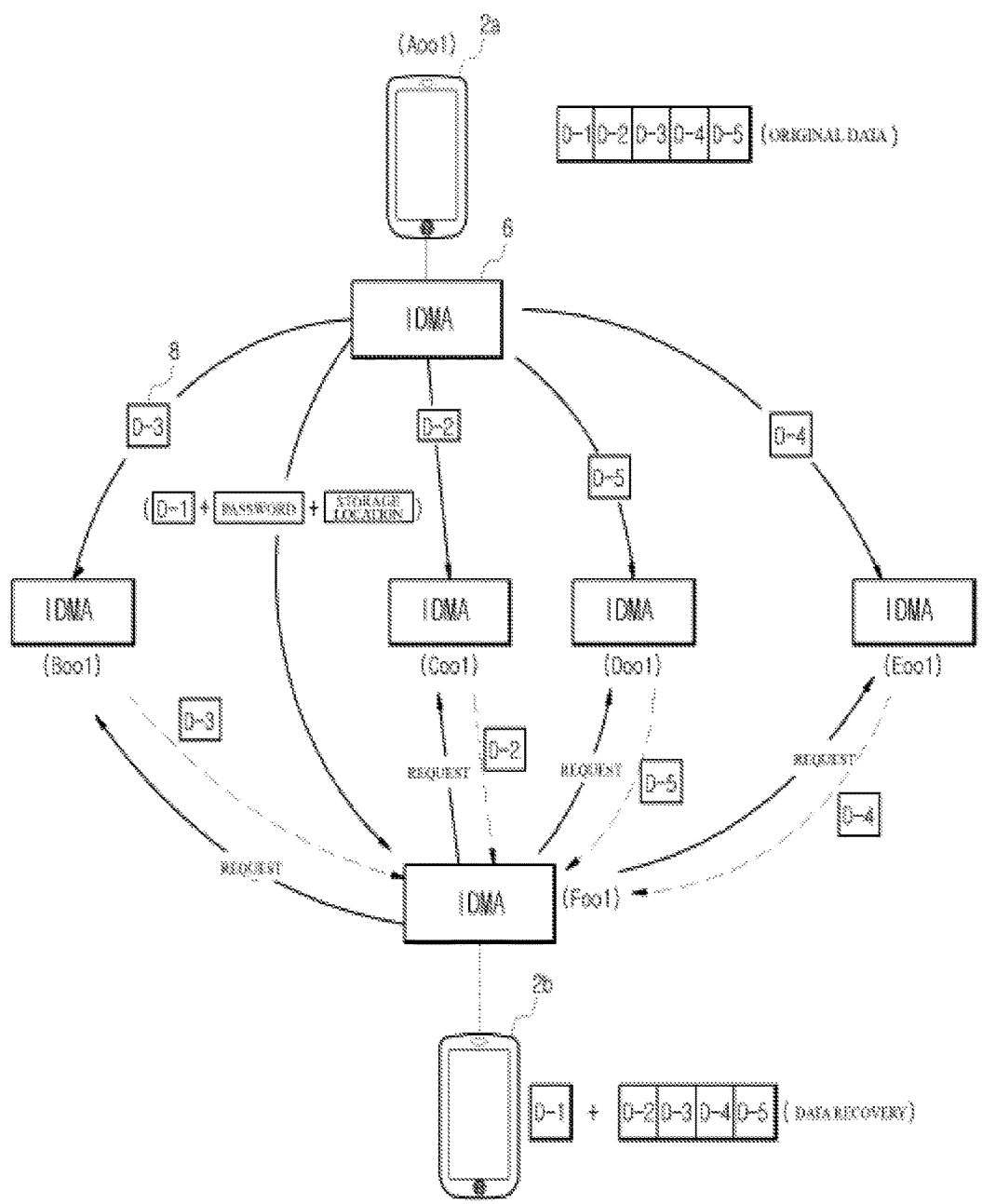
FIG. 12 is a schematic diagram illustrating a configuration of a private data management system according to a third embodiment of the present invention.

FIG. 12 is a schematic diagram illustrating a configuration of the private data management system according to the third embodiment of the present invention Referring to FIG. 12, the private data management system according to the third embodiment of the present invention is a system to recover the partitioned data of the first user terminal 2*a* (hereinafter, denoted by 2-1) stored in the plurality of second user terminals 2-2 to a specific third user terminal 2*b* (hereinafter, denoted by 2-3) designated by the first user terminal 2-1 without recovering the partitioned data to the first user terminal 2-1 as the original data 4.

Such a function is very effective in keeping data security when transmitting specific data to a specific user through e-mail transmission or SNS.

That is, the private data management application 6 of the first user terminal 2-1 is automatically driven at the time of the e-mail transmission to partition the original data 4 to be transmitted into a plurality of data, directly transmits some (for example, D-1) of the partitioned data to the private data management application 6 of the third user terminal 2-3 that is the receiving side, and transmits reading authentication information (preferably, a password) that may read the data together.

Further, the private data management application 6 of the first user terminal 2-1 transmits the remaining partitioned data to the private data management application 6 of the plurality of second user terminals 2-2 and stores the same.

In this state, if a password that may read the data is input to the private data management application 6 of the third user terminal 2-3, the private data management application 6 of the third user terminal 2-3 transmits the password information to the private data management application 6 of the first user terminal 2-1.

Then, the private data management application 6 of the first user terminal 2-1 authenticates the password and authenticates whether a data reader is legitimate. If the password is matched, the private data management application 6 of the first user terminal 2-1 generates a data transmission signal to the plurality of second user terminals 2-2 having the data distributed and stored therein.

Then, the private data management application 6 of the second user terminal 2-2 transfers the partitioned data 8 to the private data management applications 6 of the third user terminal 2-3, respectively.

Thereby, the private data management application 6 of the third user terminal 2-3 may recover the data.

This function may be operated by interworking with an e-mail server.

That is, when the e-mail transmission is clicked in the private data management application 6 of the first user terminal 2-1, the private data management application 6 of the first user terminal 2-1 generates a signal so that an e-mail application (not illustrated) designated in advance by a user is automatically driven.

Further, the private data management application 6 of the first user terminal 2-1 automatically appends any one (for example, D-1) of the partitioned data for the specific data to the e-mail and transmits a password and storage location information while inputting the password and the storage location information, for example, the identification information on the private data management application 6 of the second user terminal 2-2 into a content column of the e-mail.

Alternatively, the identification information may be transmitted using a short message instead of the e-mail.

In this case, the identification information on the third user terminal 2-3, which is the recipient's terminal, and the identification information on the private data management application 6 of the second user terminal 2-2 need to be stored in the private data management application 6 of the first user terminal 2-1, together with e-mail information on an e-mail recipient.

Further, the private data management application 6 of the first user terminal 2-1 transmits the remaining partitioned data to the second user terminals 2-2.

In this state, when a third user generates a data recovery command through the private data management application 6 to the private data management application 6 of the second user terminal 2-2, the private data management application 6 of the second user terminal 2-2 transmits the partitioned data to the third user terminal 2-3.

Thereby, the private data management application 6 of the third user terminal 2-3 receives all of the partitioned data, and when the password transmitted by the first user is input, the data is displayed on the screen.

Then, as in the case in which the present invention is applied to an e-mail transmission scheme, unless the SNS server (not illustrated) is hacked, hackers may not acquire the partitioned data transmitted to the third user terminal 2-3 by the first user terminal 2-1 through the SNS, and even if the SNS server is hacked, the hackers may not acquire all the portioned data unless the hackers hack the plurality of second user terminals 2-2, and may acquire only the specific data of one person even when they hack each user terminal 2. Therefore, the hackers little gain a profit.

Meanwhile, the private data management system and the method therefor in accordance with the exemplary embodiment of the present invention are not limited to the above exemplary embodiments but may be variously changed without departing from the technical subjects thereof.

DESCRIPTION OF REFERENCE NUMERALS

2: user terminal, 2-1, 2-2, 2-3: first, second, third user terminal
4: original data, 6: private data management application
8: partitioned data, 10: data management server

The invention claimed is:

1. A private data management method, comprising the steps of:
   a) receiving, by a private data management application installed in a user terminal, a driving signal;
   b) determining, by the private data management application, whether a data distribution selection signal is applied;
   c) determining, by the private data management application, whether a specific data is selected;
   d) requesting, by the private data management application, data transmission target information to a data management server;
   e) providing, by the data management server, the data transmission target information to the private data management application;
   f) partitioning, by the private data management application, data into a predetermined number of data and processing the partitioned data; and
   g) transmitting the respective partitioned data while arbitrarily matching the partitioned data to a data transmission target terminal,
   wherein the step e) includes randomly extracting, by the data management server, a predetermined number of identification information from an identification information pool of storage target terminals.

2. The private data management method of claim 1, wherein the step f) further includes randomly extracting, by the private data management application, some of the data transmission target terminals provided from the data management server to determine a final transmission target terminal.

3. The private data management method of claim 1, wherein the step g) further includes transmitting, by the private data management application, partitioned backup data to a separate data backup target terminal.

4. The private data management method of claim 1, further comprising the steps of: after the step g),
   h) determining, by the private data management application, whether a data recovery mode is selected;
   i) extracting, by the private data management application, information on a target terminal distributing and storing the partitioned data of data when a specific data recovery signal is received;
   j) receiving, by the private data management application, data by performing a data transmission request to a data storage target terminal; and
   k) recovering, by the private data management application, the data when the reception of the data is completed.

5. The private data management method of claim 4, wherein the step k) further includes the steps of: extracting, by the private data management application, information on a data backup storage target terminal from some terminals if the data is not received until a predetermined time elapses; and
   performing, by the private data management application, a data transmission request to the backup storage target terminal.

6. The private data management method of claim 4, further comprising the steps of: between the step h) and the step i),
   l) transmitting, by the private data management application, data information to be recovered to the data management server and requesting authentication user information of the data;
   m) transmitting, by the data management server, the authentication user information of the data to the private data management application;
   n) requesting, by the private data management application, an input of private authentication information to the user terminal of an authentication user; and
   o) transmitting, by the user terminal of the authentication user, an authentication acknowledge signal to the private data management application when private authentication succeeds in the user terminal of the authentication user.

7. The private data management method of claim 6, further comprising the steps of:
   when an authentication failure signal is received from the user terminal of the authentication user during the step o), transmitting, by the private data management application, authentication failure information to the data management server;
   transmitting, by the private data management application, a request signal of new authentication user information to the data management server when the authentication signal is not received until a predetermined time exceeds; and
   transmitting, by the data management server, the new authentication user information to the private data management application.

8. The private data management method of claim 4, the step k) further includes:
   determining whether specific partitioned data are not received until a predetermined time elapses;
   extracting user terminal information storing backup data when the specific partitioned data are not received; and
   requesting, by the private data management application, a data transmission to the user terminal storing the backup data.

9. The private data management method of claim 1, further comprising the step of:
when a transmission user terminal partitioning and transmitting data and a reception user terminal attempting to recover the partitioned and stored data are different from each other, transmitting, by a transmission user terminal, data partitioned and stored by the transmission user terminal, received authentication information, and information on a terminal storing the remaining partitioned data to the reception user terminal.

10. A private data management system, comprising:
a plurality of user terminals having a private data management application installed therein, which is driven by user authentication, and is configured to automatically partition specific data selected by the user into a plurality of data so as to distribute and transmit the data to the plurality of user terminals of a specific identification number transmitted from a data management server, and collect and recover the distributed data according to a user recovery command; and
the data management server configured to store identification information on the user terminal in which the private data management application is installed, and receive a data distribution signal from the user terminal so as to extract identification information on a specific user terminal to be a target in which data are distributed and stored, and transmit the extracted identification information of the terminal to the user terminal,
wherein the data management server is configured to randomly extract a predetermined number of identification information from an identification information pool of storage target terminals when extracting identification information on a specific user terminal.

11. The private data management system of claim 10, wherein the private data management application is configured to randomly extract a predetermined number of identification information among the identification information on the user terminal provided from the data management server.

12. The private data management system of claim 11, wherein the data management server registers single authentication user information, which is required for the authentication during recovery of the specific data, at the time of the distribution and storage of the data, and provides the authentication user information to the private data management application 6 when the private data management application requests the data recovery.

13. The private data management system of claim 12, wherein the private data management application is configured to request the input of the private authentication information to the user terminal of the authentication user when receiving the authentication user information from the data management server, and the user terminal of the authentication user transmits an authentication acknowledge signal to the private data management application when private authentication succeeds.

14. The private data management method of claim 10, wherein the private data management application is configured to store any one of the plurality of partitioned data in the user terminal, and distribute and store other data in the plurality of user terminals of a specific identification number.

15. The private data management system of claim 10, wherein the private data management application includes a communication module configured to communicate with a plurality of user terminals for distributing and storing data and the data management server;
a user authentication unit configured to authenticate a user by private identification information authentication;
a storage target information request unit configured to automatically request storage target information for distributing and storing data to the data management server;
a data partition processing unit configured to partition and process specific data selected by the user;
an encryption/decryption processing unit configured to encrypt and decrypt data to be communicated;
a data storage unit configured to store some of the partitioned data, and store information on a storage target in which each of the partitioned data is stored; and
a control unit configured to communicate with the data management server to receive the information on the data storage target, partition the specific data and store some of the specific data, transmit other data to a plurality of data storage target terminals and distribute and store the other data, and transmit a transmission request signal of the specific data to the storage target terminal during recovery of the data.

16. The private data management system of claim 15, wherein the private data management application further includes a storage target random extraction unit configured to randomly extract some of storage target information received from the data management server.

17. The private data management system of claim 15, wherein the private data management application further includes a storage target random matching unit configured to randomly match the partitioned data with a target in which the data are stored.

18. The private data management system of claim 10, wherein, when a transmission user terminal partitioning original data and a reception user terminal recovering the original data are different from each other, the user terminal is configured to transmit data partitioned and stored by the transmission user terminal, received authentication information, and information on a terminal storing the remaining partitioned data to the reception user terminal.

* * * * *